United States Patent
Sakurai et al.

(10) Patent No.: US 12,175,817 B2
(45) Date of Patent: Dec. 24, 2024

(54) CENTER DEVICE AND VEHICLE INFORMATION COMMUNICATION SYSTEM

(71) Applicant: DENSO CORPORATION, Kariya (JP)

(72) Inventors: Nao Sakurai, Kariya (JP); Shuhei Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 228 days.

(21) Appl. No.: 17/866,891

(22) Filed: Jul. 18, 2022

(65) Prior Publication Data
US 2022/0351555 A1 Nov. 3, 2022

Related U.S. Application Data

(63) Continuation of application No. PCT/JP2021/000525, filed on Jan. 8, 2021.

(51) Int. Cl.
*G07C 5/08* (2006.01)
*G06F 9/54* (2006.01)
*G07C 5/00* (2006.01)
*H04W 4/44* (2018.01)

(52) U.S. Cl.
CPC ............. *G07C 5/085* (2013.01); *G06F 9/546* (2013.01); *G07C 5/008* (2013.01); *H04W 4/44* (2018.02)

(58) Field of Classification Search
CPC ...... G07C 5/085; G07C 5/008; G07C 5/0841; G06F 9/546; H04W 4/44; B60R 16/02; G01M 17/007
See application file for complete search history.

(56) References Cited

U.S. PATENT DOCUMENTS

| 11,256,727 | B2 * | 2/2022 | Stählin | G06F 16/23 |
| 2014/0303868 | A1 * | 10/2014 | Otake | G08G 1/166 701/70 |
| 2018/0357839 | A1 * | 12/2018 | Knorr | H04W 4/40 |

FOREIGN PATENT DOCUMENTS

| CN | 101179486 B * | 7/2010 |
| JP | 2004077300 A | 3/2004 |
| JP | 2005165388 A | 6/2005 |

(Continued)

OTHER PUBLICATIONS

Machine translation CN-101179486-B (Year: 2010).*

*Primary Examiner* — Frederick M Brushaber
(74) *Attorney, Agent, or Firm* — Harness, Dickey & Pierce, P.L.C.

(57) ABSTRACT

An individual vehicle information database of a center device has a waiting queue used to sequentially write a plurality of individual vehicle information transferred by an individual vehicle information registration unit. When attempting to transfer individual vehicle information sent from a master device to the individual vehicle information database, the individual vehicle information registration unit refers to the waiting queue, and if a write waiting number is less than a predetermined number, the individual vehicle information is stored in the waiting queue. If the write waiting number is at least the predetermined number, the individual vehicle information is stored in the waiting queue if any of individual vehicle information has content satisfying a write priority condition. If all of the individual vehicle information have content not satisfying the write priority condition, the vehicle information is not stored in the waiting queue.

14 Claims, 10 Drawing Sheets

(56) References Cited

FOREIGN PATENT DOCUMENTS

| JP | 2018529141 | A | 10/2018 |
|----|------------|-----|---------|
| JP | 6480263 | B2 | 3/2019 |

* cited by examiner

FIG. 7

| VIN | VEHICLE MODELS | Vehicle SW ID | Digest | Sys ID | ECU ID | ECU SW ID | ACTIVE BANK | ACCESS LOG | REPROGRAMING STATUS |
|---|---|---|---|---|---|---|---|---|---|
| 1 | aaa | 0001 | xxxxxx | SA01_01 | ADS | aaa_ads_001 | — | 2018/12/10 07:05<br>2018/12/11 07:10<br>2018/12/12 07:08<br>... | NONE |
| | | | | SA02_01 | ENG | aaa_eng_010 | BANK A | | |
| | | | | SA02_01 | BRK | aaa_brk_001 | BANK A | | |
| | | | | SA02_01 | EPS | aaa_eps_010 | BANK A | | |
| 2 | aaa | 0002 | yyyyyy | SA01 | ADS | bbb_ads_002 | — | 2018/12/30 12:10 | ACTIVATION DONE |
| 3 | bbb | 1001 | zzzzzz | SA01 | ADS | bbb_ads_001 | — | 2018/11/04 08:23 | DOWNLOADING DONE |

213 INDIVIDUAL VEHICLE INFORMATION DB

US 12,175,817 B2

CENTER DEVICE AND VEHICLE INFORMATION COMMUNICATION SYSTEM

CROSS REFERENCE TO RELATED APPLICATION

This application is a continuation application of International Patent Application No. PCT/JP2021/000525 filed on Jan. 8, 2021, which designated the U.S. and claims the benefit of priority from Japanese Patent Application No. 2020-007527 filed on Jan. 21, 2020. The entire disclosure of all of the above application is incorporated herein by reference.

TECHNICAL FIELD

The present disclosure relates to a center device and a vehicle information communication system.

BACKGROUND ART

In recent years, the scale of application programs for vehicle control, diagnosis, and the like, installed in an electronic control unit (hereinafter, referred to as an ECU (electronic control unit)) of a vehicle, has been increased due to the diversification of vehicle control such as a driving support function and an autonomous driving function. An opportunity to rewrite (reprogram) an application program of an ECU has been increased in accordance with upgrading based on functional improvement. On the other hand, a technique for connected cars has also spreads together with the progress of communication networks or the like. There has been known a technique in which an ECU update program is distributed from a software distribution server to an vehicle-mounted device by OTA (Over The Air), and rewrite the update program on the vehicle.

SUMMARY

The present disclosure provides a center device, comprising a communication unit for wireless communication with a vehicle device mounted in a vehicle, the vehicle device including a plurality of electronic control units (ECUs); a vehicle information storage unit storing vehicle information that is transmitted from the vehicle device upon a predetermined change in vehicle status; and a control unit transmitting the vehicle information to the vehicle information storage unit and writing the vehicle information in the vehicle information storage unit when the communication unit receives the vehicle information. It characterizes in that the vehicle information storage unit includes a waiting queue for sequentially writing a plurality of vehicle information transmitted by the control unit, and the control unit is configured to, by referring to the waiting queue when transmitting the vehicle information to the vehicle information storage unit: store the vehicle information in the waiting queue when a write waiting number in the waiting queue is less than a predetermined number; store the vehicle information in the waiting queue when the write waiting number in the waiting queue is equal to or greater than the predetermined number and when any one of items included in the vehicle information satisfies a write priority condition; and not store the vehicle information in the waiting queue when the write waiting number in the waiting queue is equal to or greater than the predetermined number and when all of the items included in the vehicle information do not satisfy the write priority condition.

BRIEF DESCRIPTION OF DRAWINGS

The above and other objects, features and advantages of the present disclosure will become more apparent from the following detailed description made with reference to the accompanying drawings. In the drawings:

FIG. 7 is an image illustrating an example of vehicle the configuration information registered in an individual vehicle information DB;

DESCRIPTION OF EMBODIMENTS

Figure 1:
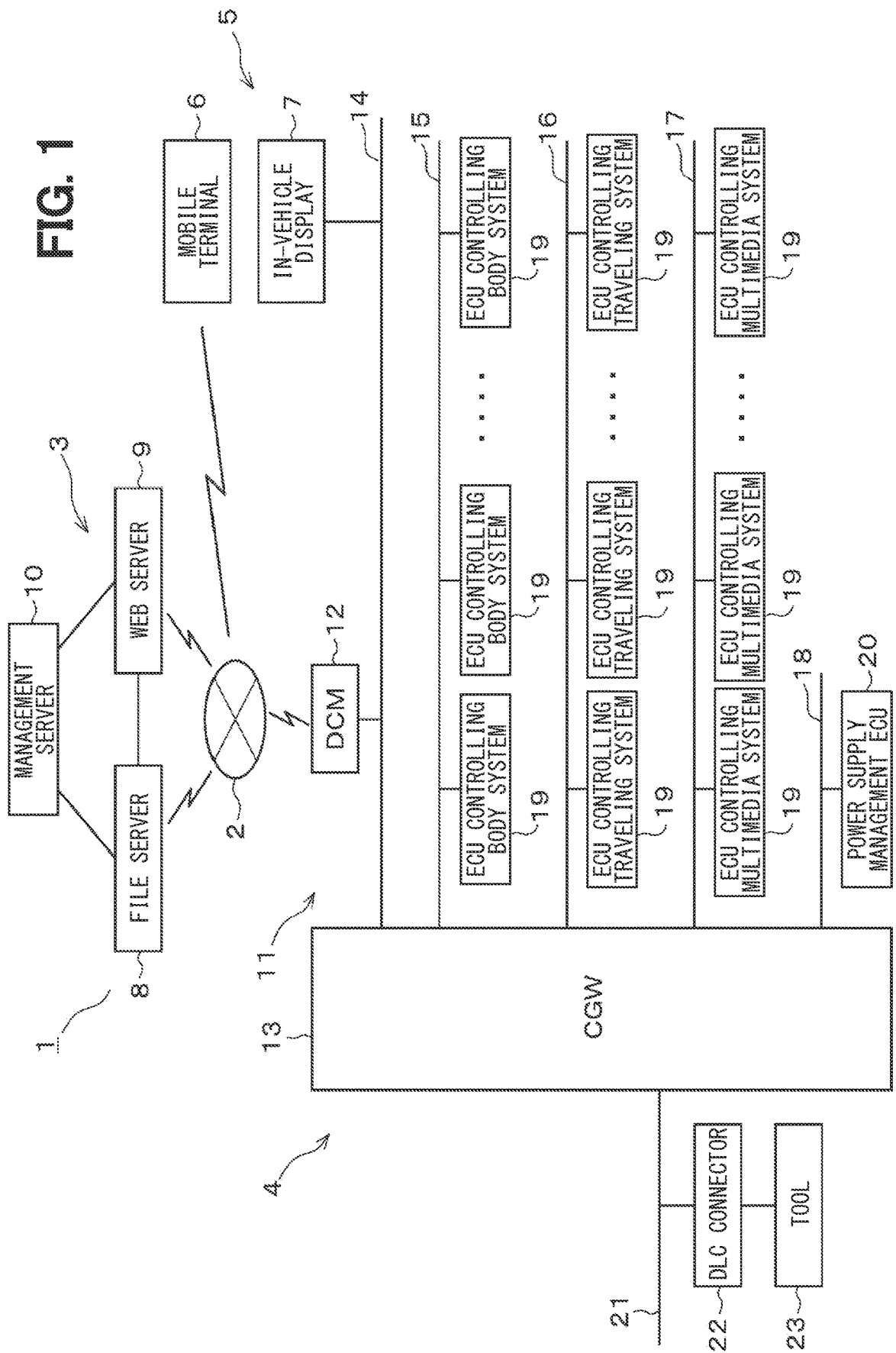
FIG. 1 is a diagram illustrating an overall configuration of a vehicle information communication system in a first embodiment.

As a premise of performing the reprogram as described above, the center device provided with a server that distributes the update program needs to grasp the information such as the program version of the electronic control unit mounted on each vehicle. Therefore, in the abovementioned system, each vehicle transmits vehicle information to the center device at a predetermined timing, and the center device stores the transmitted vehicle information in a storage unit.

However, when vehicle information from a large amount of vehicles is concentrated and transmitted to the center device at a specific time of a day, for example in the morning when many people are getting on and going to work, the center device may not be able to process all the information.

The present disclosure has been made in view of the above circumstances, and one object thereof is to provide a center device and a vehicle information communication system capable of efficiently processing vehicle information even when vehicle information from the large number of vehicles is centrally transmitted at the specific time of the day.

Regarding the center device according to a first aspect of the present disclosure, the vehicle information storage unit has a waiting queue for sequentially writing a plurality of vehicle information transferred by the control unit. The control unit refers to the waiting queue when it tries to transfer vehicle information transmitted from the vehicle device on the occasion of a predetermined vehicle status change to the vehicle information storage unit, and stores the individual vehicle information in the waiting queue when a write waiting number is lower than the predetermined number. On the other hand, when the write waiting number in the waiting queue is equal to or greater than the predetermined number, the control unit inputs the individual vehicle information once any one of the individual vehicle information satisfies the write priority condition. Although it is stored in the waiting queue, when all of the above individual vehicle information do not satisfy the write priority conditions, the individual vehicle information cannot be stored in the waiting queue.

That is, when the write waiting number in the wait queue exceeds a predetermined number due to the concentrated transmission of vehicle information from a large amount of vehicle devices in the specific time of the day, the control unit decides whether to store the vehicle information in the waiting queue according to whether any of the vehicle information satisfy the write priority conditions. In this regard, when the control unit receives a large number of individual vehicle information intensively, once any one of the individual vehicle information satisfies the write priority conditions, the information is stored in the vehicle information storage unit by storing in the waiting queue. Therefore, the large amount of vehicle information can be efficiently processed according to the contents.

Regarding the center device according to a second aspect of the present disclosure, one of the above individual vehicle information is access log information indicating the date and time when the vehicle device transmits the information in chronological order, and the control unit has an access frequency based on the access log information. Once the access frequency is less than the predetermined frequency, it is determined that the write priority condition is satisfied. As a result, the control unit can preferentially transfer and store the individual vehicle information of the vehicle with a relatively low access frequency and few opportunities to transmit the individual vehicle information to the vehicle information storage unit.

The present disclosure provides a program product for a center device. The center device includes a communication unit for wireless communication with a vehicle device mounted in a vehicle, the vehicle device including a plurality of electronic control units (ECUs); a vehicle information storage unit storing vehicle information that is transmitted from the vehicle device upon a predetermined change in vehicle status; and a control unit transmitting the vehicle information to the vehicle information storage unit and writing the vehicle information in the vehicle information storage unit when the communication unit receives the vehicle information. The vehicle information storage unit includes a waiting queue for sequentially writing a plurality of vehicle information transmitted by the control unit. The program is stored in at least one computer readable medium and comprises instructions configured to, when executed, cause the control unit to, by referring to the waiting queue when transmitting the vehicle information to the vehicle information storage unit: store the vehicle information in the waiting queue when a write waiting number in the waiting queue is less than a predetermined number; store the vehicle information in the waiting queue when the write waiting number in the waiting queue is equal to or greater than the predetermined number and when any one of items included in the vehicle information satisfies a write priority condition; and not store the vehicle information in the waiting queue when the write waiting number in the waiting queue is equal to or greater than the predetermined number and when all of the items included in the vehicle information do not satisfy the write priority condition.

The present disclosure provides a method for a center device. The center device includes: a communication unit for wireless communication with a vehicle device mounted in a vehicle, the vehicle device including a plurality of electronic control units (ECUs); a vehicle information storage unit storing vehicle information that is transmitted from the vehicle device upon a predetermined change in vehicle status; and a control unit transmitting the vehicle information to the vehicle information storage unit and writing the vehicle information in the vehicle information storage unit when the communication unit receives the vehicle information. The vehicle information storage unit includes a waiting queue for sequentially writing a plurality of vehicle information transmitted by the control unit. The method comprises, by referring to the waiting queue when transmitting the vehicle information to the vehicle information storage unit: storing, with the control unit, the vehicle information in the waiting queue when a write waiting number in the waiting queue is less than a predetermined number; storing, with the control unit, the vehicle information in the waiting queue when the write waiting number in the waiting queue is equal to or greater than the predetermined number and when any one of items included in the vehicle information satisfies a write priority condition; and not storing, with the control unit, the vehicle information in the waiting queue when the write waiting number in the waiting queue is equal to or greater than the predetermined number and when all of the items included in the vehicle information do not satisfy the write priority condition.

The present disclosure provides a program product for a vehicle information communication system. The system includes a vehicle device including a plurality of electronic control units (ECUs) mounted in a vehicle; and a center device including a communication unit for wireless communication with the vehicle device. The center device further includes: a vehicle information storage unit storing vehicle information transmitted from the vehicle device upon a predetermined change in vehicle status; and a control unit transmitting the vehicle information to the vehicle information storage unit and controlling the vehicle information storage unit to store the vehicle information therein when the communication unit receives the vehicle information. The vehicle information storage unit includes a waiting queue for sequentially writing a plurality of vehicle information transmitted by the control unit. The program product is stored on at least computer readable medium and comprises instructions configured to, when executed, cause the control unit to, by referring to the waiting queue when transmitting the vehicle information to the vehicle information storage unit: store the vehicle information in the waiting queue when a write waiting number in the waiting queue is less than a predetermined number; store the vehicle information in the waiting queue when the write waiting number in the waiting queue is equal to or greater than the predetermined number and when any one of items included in the vehicle information satisfies a write priority condition; and not store the vehicle information in the waiting queue when the write waiting number in the waiting queue is equal to or greater than the predetermined number and when all of the items included in the vehicle information do not satisfy the write priority condition.

The present disclosure provides a method for a vehicle information communication system. The system includes a vehicle device including a plurality of electronic control units (ECUs) mounted in a vehicle; and a center device including a communication unit for wireless communication with the vehicle device. The center device further includes a vehicle information storage unit storing vehicle information transmitted from the vehicle device upon a predetermined change in vehicle status; and a control unit transmitting the vehicle information to the vehicle information storage unit and controlling the vehicle information storage unit to store the vehicle information therein when the communication unit receives the vehicle information. The vehicle information storage unit includes a waiting queue for sequentially writing a plurality of vehicle information transmitted by the control unit The method comprises, by referring to the waiting queue when transmitting the vehicle information to the vehicle information storage unit: storing, with the control unit, the vehicle information in the waiting queue when a write waiting number in the waiting queue is less than a predetermined number; storing, with the control unit, the vehicle information in the waiting queue when the write waiting number in the waiting queue is equal to or greater than the predetermined number and when any one of items included in the vehicle information satisfies a write priority condition; and not storing, with the control unit, the vehicle information in the waiting queue when the write waiting number in the waiting queue is equal to or greater than the predetermined number and when all of the items included in the vehicle information do not satisfy the write priority condition.

Hereinafter, one embodiment will be described with reference to the drawings. A vehicle program rewriting system is a system capable of rewriting an application program such as vehicle control and diagnosis of an ECU mounted on a vehicle through OTA. As illustrated in FIG. 1, a vehicle program rewriting system 1 includes a center device 3 on a side of a communication network 2, a vehicle system 4 mounted in a vehicle, and a display terminal 5. The communication network 2 is configured to include, for example, a mobile object communication network such as a 4G line, the Internet, and Wi-Fi (Wireless Fidelity (registered trademark)).

The display terminal 5 is a terminal having a function of receiving operation input from a user and a function of displaying various screens, and is, for example, a mobile terminal 6 such as a smartphone or a tablet computer that can be carried by a user, and an in-vehicle display 7 such as a display or a meter display that is also used as a navigation function disposed in a vehicle compartment. The mobile terminal 6 can be connected to the communication network 2 as long as the mobile terminal 6 is within a communication range of a mobile object communication network. The in-vehicle display 7 is connected to the vehicle system 4.

As long as a user is located outside the vehicle compartment and is within the communication range of the mobile object communication network, the user can input while checking various screens related to rewriting of an application program with the mobile terminal 6, and can perform a procedure related to the rewriting of the application program. In the vehicle compartment, the user can input while checking various screens related to rewriting of the application program with the in-vehicle display 7, and can perform a procedure related to rewriting of the application program. Which is to say, the user can use the mobile terminal 6 and the in-vehicle display 7 separately outside the vehicle compartment and can perform a procedure related to rewriting of the application program in the vehicle compartment.

The center device 3 controls an OTA function of the side of the communication network 2 in the vehicle program rewriting system 1, and functions as an OTA center. The center device 3 includes a file server 8, a web server 9, and a management server 10, and each of the servers 8 to 10 is configured to be able to have data communication with each other.

The file server 8 has a function of managing an application program transmitted from the center device 3 to the vehicle system 4, and is a server that manages an ECU program provided from a supplier or the like that is a provider of the application program, information associated with the ECU program, distribution specification data provided from an OEM (original equipment manufacturer), vehicle conditions acquired from the vehicle system 4, and the like. The file server 8 can perform data communication with the vehicle system 4 via the communication network 2, and transmits a distribution package in which the reprogramming data and the distribution specification data are packaged to the vehicle system 4 when a download request for the distribution package is generated. The web server 9 is a server that manages web information, and provides various screens related to rewriting an application program to the mobile terminal 6. The management server 10 manages personal information of a user registered in a service of rewriting application program, a rewrite history of application program for each vehicle, and the like.

The vehicle system 4 has a master device 11. The master device 11 has a DCM 12 and a CGW 13, and the DCM 12 and the CGW 13 are connected to each other via a first bus 14 to be able to have data communication. The DCM 12 is an in-vehicle communication device that performs data communication with the center device 3 via the communication network 2, and, when a distribution package is downloaded from the file server 8, extracts write data from the distribution package, and transfers the write data to the CGW 13. The master device 11 is an example of a vehicle device.

The CGW 13 is a vehicle gateway device having a data relay function, and, when the write data is acquired from the DCM 12, the CGW 13 distributes the write data to a rewrite target ECU in which an application program is rewritten. The master device 11 controls the OTA function of the vehicle in the vehicle program rewriting system 1, and functions as an OTA master. In FIG. 1, a configuration in which the DCM 12 and the in-vehicle display 7 are connected to the same first bus 14 is illustrated as an example, but the DCM 12 and the in-vehicle display 7 may be configured to be connected to separate buses.

In addition to the first bus 14, a second bus 15, a third bus 16, a fourth bus 17, and a fifth bus 18 are connected to the CGW 13 as buses inside the vehicle, and various ECUs 19 are connected via the buses 15 to 17, and a power supply management ECU 20 is connected via the bus 18.

The second bus 15 is, for example, a body system network bus. The ECUs 19 connected to the second bus 15 are ECUs controlling the body system including, for example, a door ECU controlling locking/unlocking of a door, a meter ECU controlling display on the meter display, an air conditioner ECU controlling driving of an air conditioner, and a window ECU controlling opening and closing of a window. The third bus 16 is, for example, a traveling system network bus. The ECUs 19 connected to the third bus 16 are ECUs controlling the traveling system including, for example, an engine ECU for controlling driving of an engine, a brake ECU for controlling driving of a brake, an ECT (ETC (Electronic Toll Collection System) (registered trademark)) ECU for controlling driving of an automatic transmission, and a power steering ECU for controlling a driving of a power steering.

The fourth bus 17 is, for example, a multimedia system network bus. The ECUs 19 connected to the fourth bus 17 are ECUs controlling the multimedia system including, for example, a navigation ECU controlling a navigation system, and an ETC ECU controlling an electronic toll collection system. The buses 15 to 17 may be system buses other than the body system network bus, the traveling system network bus, and the multimedia system network bus. The number of buses and the number of the ECUs 19 are not limited to the exemplified configuration.

The power supply management ECU 20 is an ECU having a function of managing power to be supplied to the DCM 12, the CGW 13, the various ECUs 19, and the like.

A sixth bus 21 is connected to the CGW 13 as a bus outside the vehicle. A DLC (data link coupler) connector 22 to which a tool 23 is detachably connected is connected to the sixth bus 21. The buses 14 to 18 inside the vehicle and the bus 21 outside the vehicle are configured with, for example, CAN (Controller Area Network) (registered trademark) buses, and the CGW 13 performs data communication with the DCM 12, the various ECUs 19, and the tool 23 in accordance with the CAN data communication standard and the diagnosis communication standard (UDS: ISO14229). The DCM 12 and the CGW 13 may be connected to each other via Ethernet, and the DLC connector 22 and the CGW 13 may be connected to each other via Ethernet.

When write data is received from the CGW 13, the rewrite target ECU 19 writes the write data into a flash memory to rewrite an application program. In the above configuration, when a request for acquiring write data is received from the rewrite target ECU 19, the CGW 13 functions as a reprogramming master that distributes the write data to the rewrite target ECU 19. When the write data is received from the CGW 13, the rewrite target ECU 19 functions as a reprogramming slave that writes the write data into the flash memory to rewrite the application program.

Modes of rewriting the application program include a mode of rewriting by wire and a mode of rewriting by wireless. In the aspect in which the application program is rewritten in a wired manner, when the tool 23 is connected to the DLC connector 22, the tool 23 transfers the write data to the CGW 13. The CGW 13 relays or distributes the write data transferred from the tool 23 to the rewrite target ECU 19. In the aspect in which the application program is rewritten in a wireless manner, as described above, when the distribution package is downloaded from the file server 8, the DCM 12 extracts the write data from the distribution package, and transfers the write data to the CGW 13.

Figure 2:
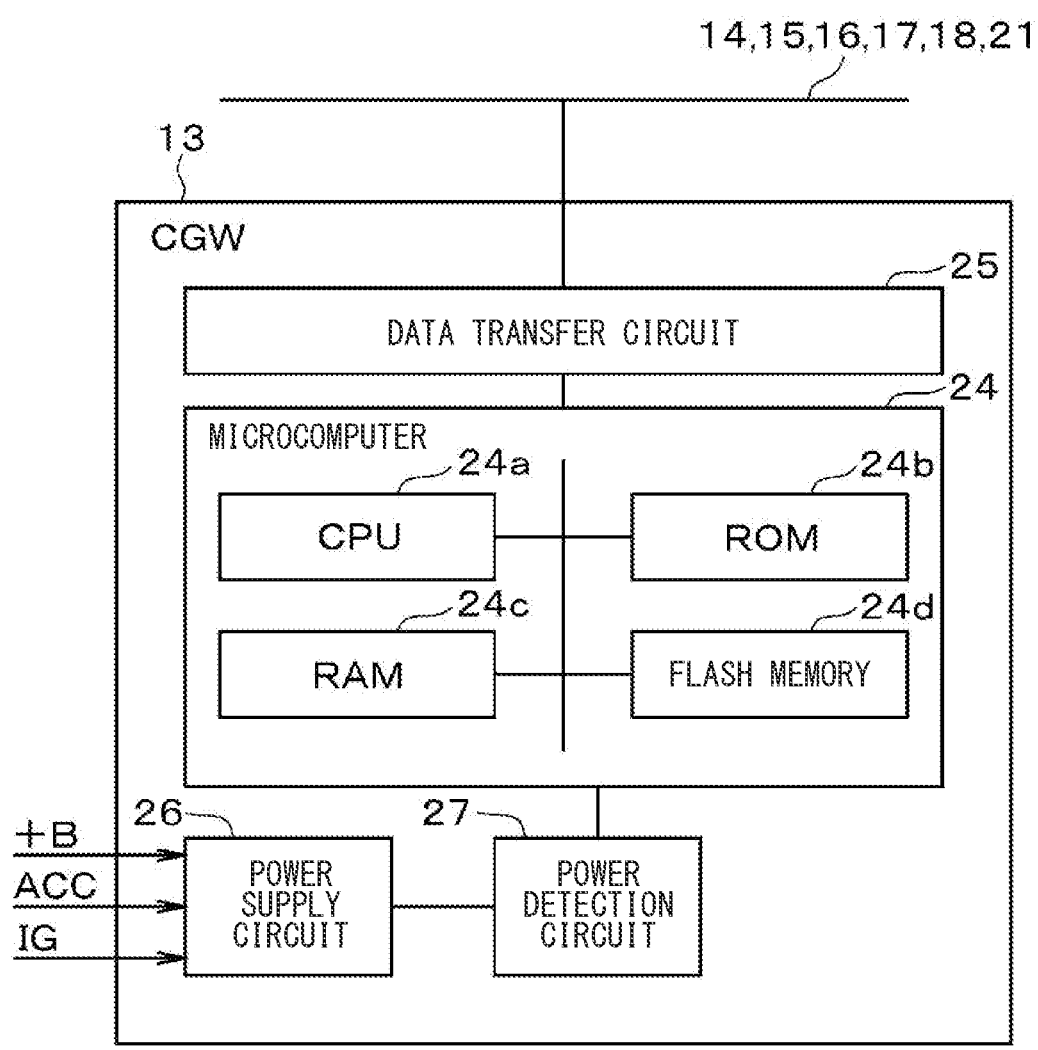
FIG. 2 is a diagram illustrating an electrical configuration of a CGW.

As illustrated in FIG. 2, the CGW 13 includes a microcomputer 24 (hereinafter, referred to as "micro"), a data transfer circuit 25, a power supply circuit 26, and a power detection circuit 27 as electrical functional blocks. The micro 24 includes a CPU (central processing unit) 24a, a ROM (read only memory) 24b, a RAM (random access memory) 24c, and a flash memory 24d. The micro 24 performs various processes by executing various control programs stored in a non-transitory tangible storage medium, and controls an operation of the CGW 13.

The data transfer circuit 25 controls data communication with the buses 14 to 18 and 21 in accordance with the CAN data communication standard and the diagnosis communication standard. The power supply circuit 26 receives battery power (hereinafter, referred to as +B power), accessory power (hereinafter, referred to as ACC power), and ignition power (hereinafter, referred to as IG power). The power detection circuit 27 detects a voltage value of the +B power, a voltage value of the ACC power, and a voltage value of the IG power received by the power supply circuit 26, compares the detected voltage values with predetermined voltage threshold values, and outputs comparison results to the micro 24. The micro 24 determines whether the +B power, the ACC power, and the IG power supplied to the CGW 13 from the outside are normal or abnormal on the basis of the comparison results that are input from the power detection circuit 27.

Figure 3:
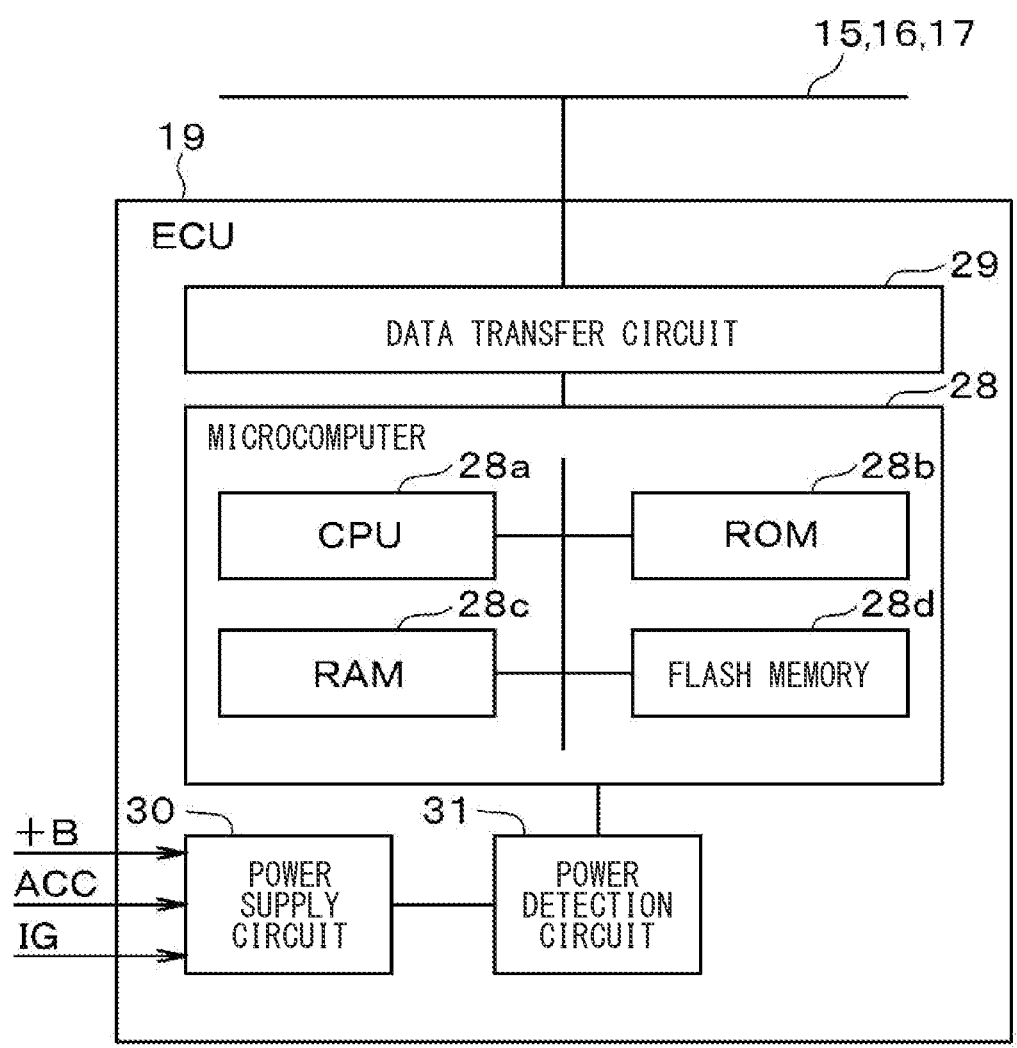
FIG. 3 is a diagram illustrating an electrical configuration of an ECU.

As illustrated in FIG. 3, the ECU 19 includes a micro 28, a data transfer circuit 29, a power supply circuit 30, and a power detection circuit 31 as electrical functional blocks. The micro 28 includes a CPU 28a, a ROM 28b, a RAM 28c, and a flash memory 28d. The micro 28 performs various processes by executing various control programs stored in a non-transitory tangible storage medium, and controls an operation of the ECU 19.

The data transfer circuit 29 controls data communication with the buses 15 to 17 in accordance with the CAN data communication standard. The power supply circuit 30 receives +B power, ACC power, and IG power. The power detection circuit 31 detects a voltage value of the +B power, a voltage value of the ACC power, and a voltage value of the IG power received by the power supply circuit 30, compares the detected voltage values with predetermined voltage threshold values, and outputs comparison results to the micro 28. The micro 28 determines whether the +B power, the ACC power, and the IG power supplied to the ECU 19 from the outside are normal or abnormal on the basis of the comparison results that are input from the power detection circuit 27. The ECUs 19 fundamentally have the same configuration except that loads such as sensors or actuators connected thereto are different from each other. A fundamental configuration of each of the DCM 12, the in-vehicle display 7, and the power supply management ECUs are the same as that of the ECU 19 illustrated in FIG. 3.

Figure 4:
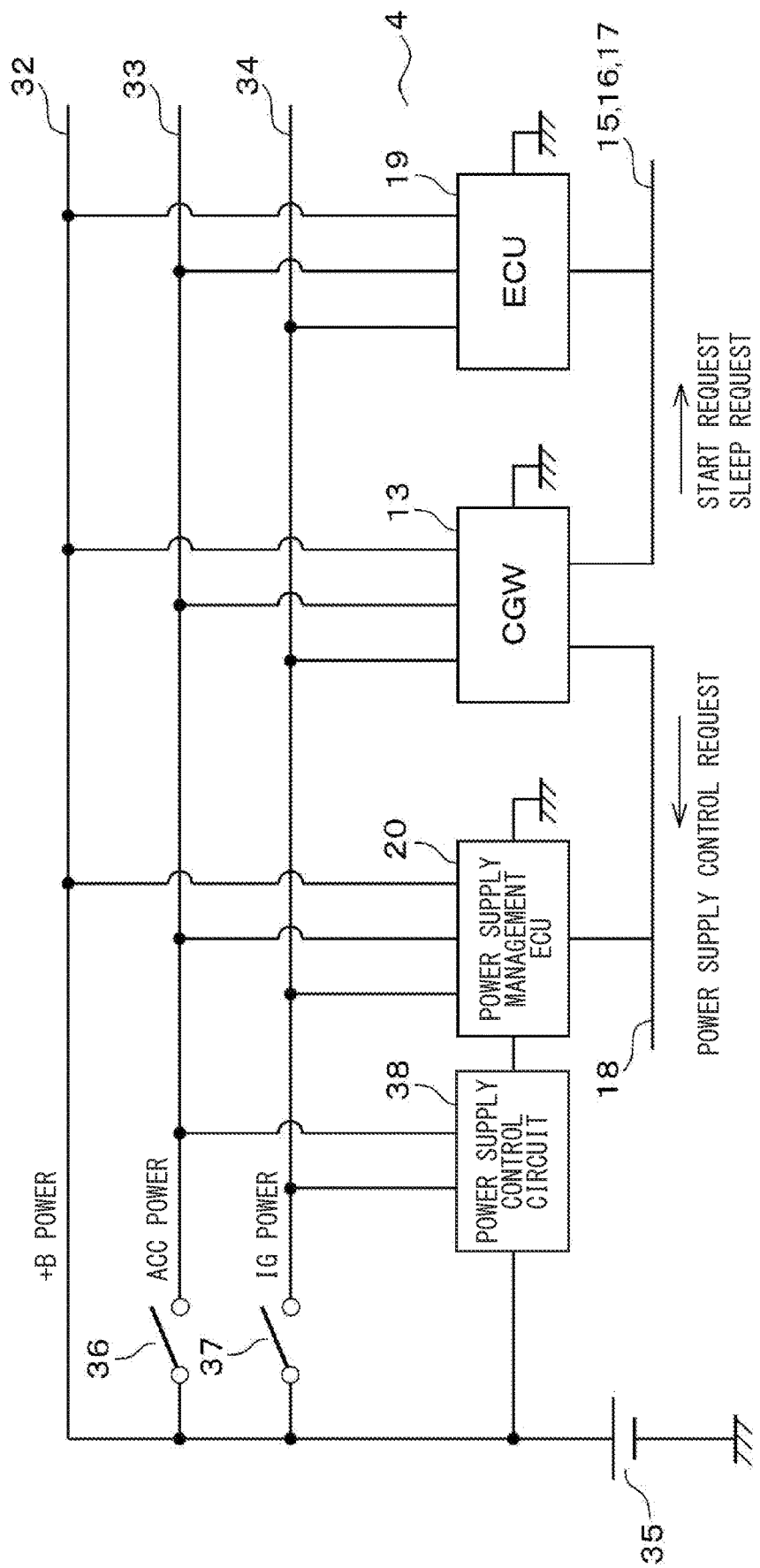
FIG. 4 is a diagram illustrating a connection aspect of power lines.

As illustrated in FIG. 4, the power supply management ECU 20, the CGW 13, and the ECU 19 are connected to a +B power line 32, an ACC power line 33, and an IG power line 34. The +B power line 32 is connected to a positive electrode of a vehicle battery 35. The ACC power line 33 is connected to the positive electrode of the vehicle battery 35 via an ACC switch 36. When the user performs an ACC operation, the ACC switch 36 switches from an OFF state to an ON state, and an output voltage of the vehicle battery 35 is applied to the ACC power line 33. For example, in a case of a vehicle of the type to insert a key into an insertion port, the ACC operation is an operation of rotating the key from an "OFF" position to an "ACC" position by inserting the key into the insertion port, and, in a case of a vehicle of the type to press a start button, the ACC operation is an operation of pressing the start button once.

The IG power line 34 is connected to the positive electrode of the vehicle battery 35 via an IG switch 37. When the user performs an IG operation, the IG switch 37 switches from an OFF state to an ON state, and an output voltage of the vehicle battery 35 is applied to the IG power line 34. For example, in a case of a vehicle of the type to insert a key into an insertion port, the IG operation is an operation of rotating the key from an "OFF" position to an "ON" position by inserting the key into the insertion port, and, in a case of a vehicle of the type to press a start button, the IG operation is an operation of pressing the start button twice. A negative electrode of the vehicle battery 35 is grounded.

When both of the ACC switch 36 and the IG switch 37 are in an OFF state, only the +B power is supplied to the vehicle system 4. The state in which only the +B power is supplied to the vehicle system 4 will be referred to as a +B power supply state. When the ACC switch 36 is in an ON state and the IG switch 37 is in an OFF state, the ACC power and the +B power are supplied to the vehicle system 4. The state in which the ACC power and the +B power are supplied to the vehicle system 4 will be referred to as an ACC power supply state. When both of the ACC switch 36 and the IG switch 37 are in an ON state, the +B power, the ACC power, and the IG power are supplied to the vehicle system 4. The state in which the +B power, the ACC power, and the IG power are supplied to the vehicle system 4 will be referred to as an IG power supply state.

The ECUs 19 have different start conditions depending on power supply states, and are classified as a +B ECU that is started in the +B power supply state, an ACC ECU that is started in the ACC power supply state, and an IG ECU that is started in the IG power supply state. For example, the ECU 19 driven in an application such as vehicle theft is the +B ECU. For example, the ECU 19 driven in a non-traveling system application such as an audio is the ACC ECUs. For example, the ECU 19 driven in a traveling system application such as engine control is the IG ECU.

The CGW 13 transmits a start request to the ECU 19 that is in a sleep state, and thus causes the ECU 19 that is a transmission destination of the start request to transition from the sleep state to a start state. The CGW 13 also transmits a sleep request to the ECU 19 that is in a start state, and thus causes the ECU 19 that is a transmission destination of the sleep request to transition from the start state to a sleep state. The CGW 13 selects the ECU 19 that is a transmission destination of the start request or the sleep request from the plurality of ECUs, for example, by making waveforms of the transmission signals to be transmitted to the buses 15 to 17 different from each other.

The power supply control circuit 38 is connected in parallel to the ACC switch 36 and the IG switch 37. The CGW 13 transmits a power supply control request to the power supply management ECU 20 and causes the power supply management ECU 20 to control the power supply control circuit 38. Which is to say, the CGW 13 transmits a power supply start request as the power supply control request to the power supply management ECU 20, to connect the ACC power line 33 or the IG power line 34 to the positive electrode of the vehicle battery 35 in the power supply control circuit 38. In this state, the ACC power or IG power is supplied to the vehicle system 4 even when the ACC switch 36 and the IG switch 37 are turned off. The CGW 13 transmits a power supply stop request as the power supply control request to the power supply management ECU 20, to disconnect the ACC power line 33 or IG power line 34 from the positive electrode of the vehicle battery 35 in the power supply control circuit 38.

The DCM 12, the CGW 13, and the ECU 19 have a self-retention power function. Which is to say, when vehicle power switches from the ACC power or the IG power to the +B power in the start state, the DCM 12, the CGW 13, and the ECU 19 do not transition from the start state to the sleep state or the stop state immediately after the switching, but continue the start state for a predetermined time even immediately after the switching, and thus self-retain the drive power. The DCM 12, the CGW 13, and the ECU 19 transition from the start state to the sleep state or the stop state when a predetermined time (for example, several seconds) has elapsed immediately after the vehicle power switches from the ACC power or IG power to the +B power.

Figure 5:
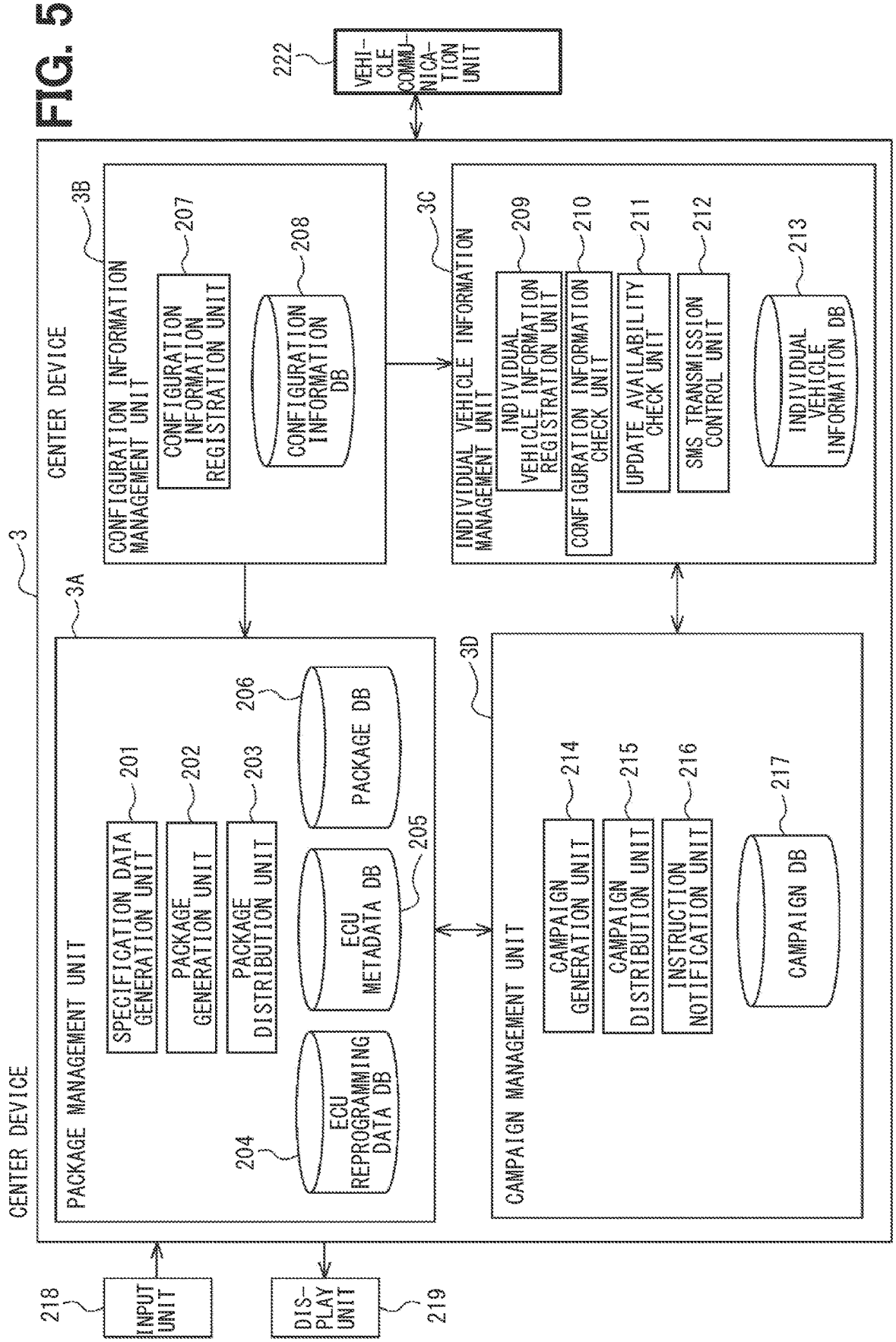
FIG. 5 is a block diagram illustrating portions of a center device related to respective main functions of a server.
Figure 6:
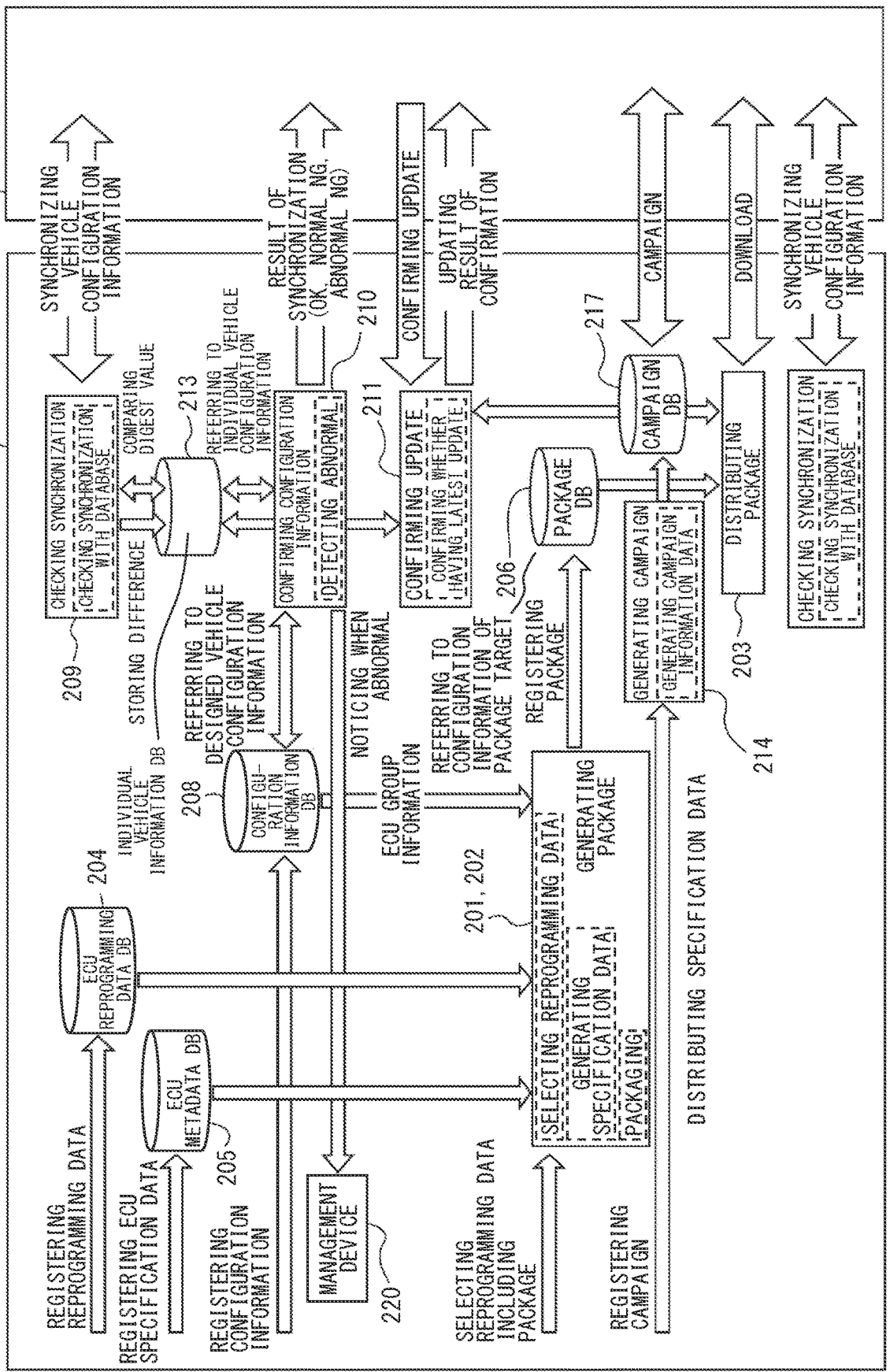
FIG. 6 is an image illustrating a flow of processes in the center device.

FIG. 5 is a block diagram mainly illustrating portions related to functions of the servers 8 to 10 in the center device 3. FIG. 6 illustrates an outline of processes performed by the center device 3 with respect to program update in the ECU. In the following description, a "database" will be referred to as a "DB" in some cases. As illustrated in FIG. 5, the center device 3 includes a package management unit 3A, a configuration information management unit 3B, an individual vehicle information management unit 3C, and a campaign management unit 3D. The package management unit 3A includes a specification data generation unit 201, a package generation unit 202, a package distribution unit 203, an ECU reprogramming data DB 204, an ECU metadata DB 205, and a package DB 206. The configuration information management unit 3B includes a configuration information registration unit 207 and a configuration information DB 208.

The supplier registers ECU individual data by using an input unit 218 and a display unit 219 that are user interface (UI) functions of the management server 10. The ECU individual data includes a program file such as a new program or difference data, verification data or a size of the program file, program file related information such as encryption methods, and ECU attribute information such as a memory structure of the ECU 19. The program file is stored in the ECU reprogramming data DB 204. The ECU attribute information is stored in the ECU metadata DB 205. The program file related information may be stored in the ECU reprogramming data DB 204 or may be stored in the ECU metadata DB 205. The ECU reprogramming data DB 204 is an example of an update data storage unit. The ECU metadata DB 205 is an example of a device related information storage unit.

The OEM registers approved configuration information in the configuration information DB 208 for each vehicle type via the configuration information registration unit 207. The approved configuration information is configuration information of a vehicle approved by a public organization. The configuration information is identification information regarding hardware and software of the ECU 19 mounted on a vehicle, and is an example of vehicle related information. The configuration information includes identification information of a system configuration formed of a plurality of ECUs 19 and identification information of a vehicle configuration formed of a plurality of systems. As the configuration information, vehicle restriction information related to program update may be registered. For example, group information of the ECU described in the rewrite specification data, a bus load table, and information regarding a battery load may be registered. The ECU metadata DB 205 is an example of a device related information storage unit.

The specification data generation unit 201 refers to each DB and generates rewrite specification data. The package generation unit 202 generates a distribution package including rewrite specification data and reprogramming data, and registers the distribution package in the package DB 206. The package generation unit 202 may generate a distribution package including the distribution specification data. The package distribution unit 203 distributes the registered distribution package to the vehicle system 4. The distribution package corresponds to a file.

The individual vehicle information management unit 3C includes an individual vehicle information registration unit 209, a configuration information check unit 210, an update availability check unit 211, an SMS transmission control unit 212, and an individual vehicle information DB 213. The individual vehicle information registration unit 209 temporarily stores individual vehicle information uploaded from each vehicle in a buffer such as RAM, and registers the individual vehicle information uploaded from individual vehicles in the individual vehicle information DB 213. The individual vehicle information registration unit 209 may register, as initial values, the individual vehicle information at the time of vehicle production or sales in the individual vehicle information DB 213. When the uploaded individual vehicle information is registered, the configuration information check unit 210 collates the individual vehicle information with the configuration information of the same type vehicle registered in the configuration information DB 208. The update availability check unit 211 checks the availability of update using a new program, that is, the availability of a campaign with respect to the individual vehicle information. In a case where the individual vehicle information is updated, the SMS transmission control unit 212 transmits a message related to the update to a corresponding vehicle by SMS (short message service). The individual vehicle information is an example of vehicle information, and the individual vehicle information registration unit 209 is an example of a control unit.

The campaign management unit 3D includes a campaign generation unit 214, a campaign distribution unit 215, an instruction notification unit 216, and a campaign DB 217. The OEM causes the campaign generation unit 214 to generate campaign information that is information related to the update of the program, and registers the campaign information in the campaign DB 217. The campaign information here corresponds to the "distribution specification data" described above, and is mainly related to an update content displayed on the vehicle system 4. The campaign distribution unit 215 distributes the campaign information to the vehicle. The instruction notification unit 216 notifies the vehicle of a necessary instruction related to the program update. In the vehicle system 4, for example, the user determines whether or not to download the update program on the basis of the campaign information transmitted from the center device 3, and downloads the update program if necessary.

The portions of each of the management units 3A to 3D except the databases are functions realized by computer hardware and software. The vehicle communication unit 222 is a functional block for performing data communication between the center device 3 and the vehicle system 4 in a wireless manner.

Next, the individual vehicle information DB 213 according to the gist of the present embodiment will be described. As illustrated in FIG. 7, as an example, the following data for each individual vehicle is registered in the individual vehicle information DB 213. Generally, configuration information for each individual vehicle or status information of an individual vehicle with respect to program update is registered. Specifically, "VIN", which is an ID of each vehicle, the "Vehicle SW ID", the "Sys ID", the "ECU ID", the "ECU SW ID" and the like that are configuration information are registered. A "Digest" value that is a hash value for the configuration information is also calculated and stored in the center device 3. An "active bank" is a bank on which a program currently operated by the ECU 19 is written in a case where a memory configuration has a double-bank, and an uploaded value is registered along with the configuration information.

An "access log" is the date and time when the vehicle uploaded the individual vehicle information to the center device 3. A "reprogramming status" indicates a status of reprogramming in the vehicle, and includes, for example, "campaign issued", "activation completed", and "download completed". In other words, it can be seen from this progress status to which phase the reprogramming in the vehicle advances and in which phase the reprogramming is delayed. When the configuration information or the like is uploaded from the vehicle system 4 to the center device 3, the "VIN" of each vehicle is added to the information or the like. The individual vehicle information DB 213 is an example of a vehicle information storage unit.

Figure 10:
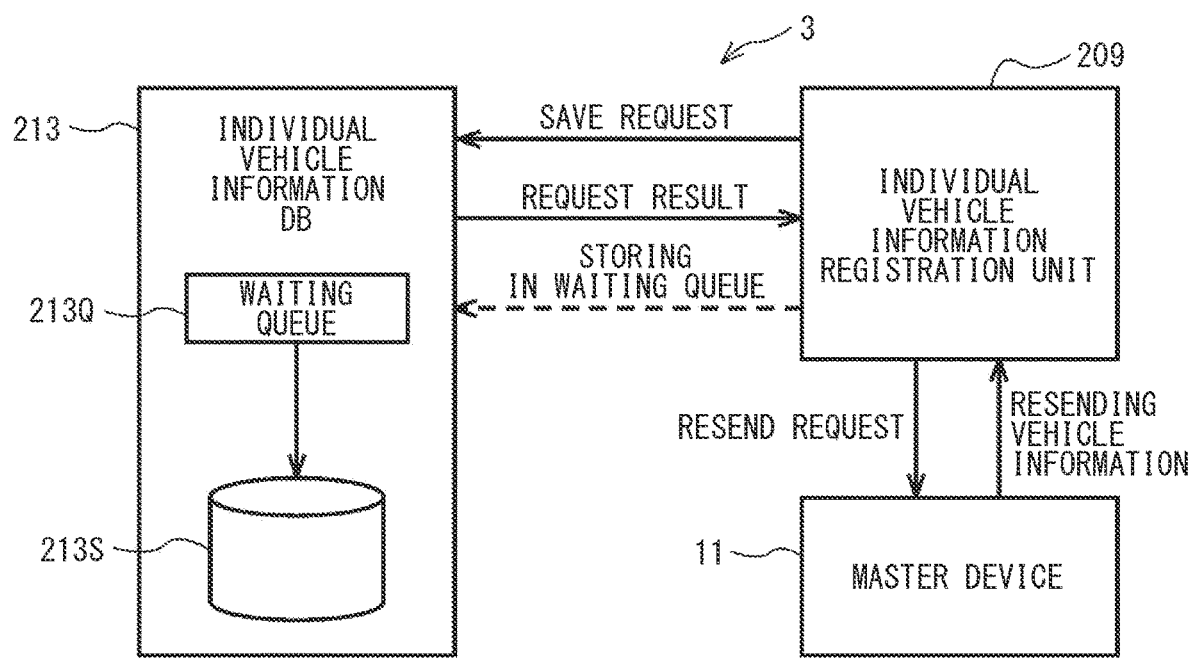
FIG. 10 is a functional block diagram showing a portion related to the gist of the present disclosure.

As shown in FIG. 10, the individual vehicle information DB 213 is provided with a waiting queue 213Q as shown below, in order to sequentially write and store the individual vehicle information uploaded from each vehicle. The uploaded individual vehicle information is temporarily stored in the waiting queue 213Q, and is sequentially written in the storage device 213S by the FIFO (Fast In Fast Out) method. The storage device 213S includes a non-volatile storage medium.

Figure 8:
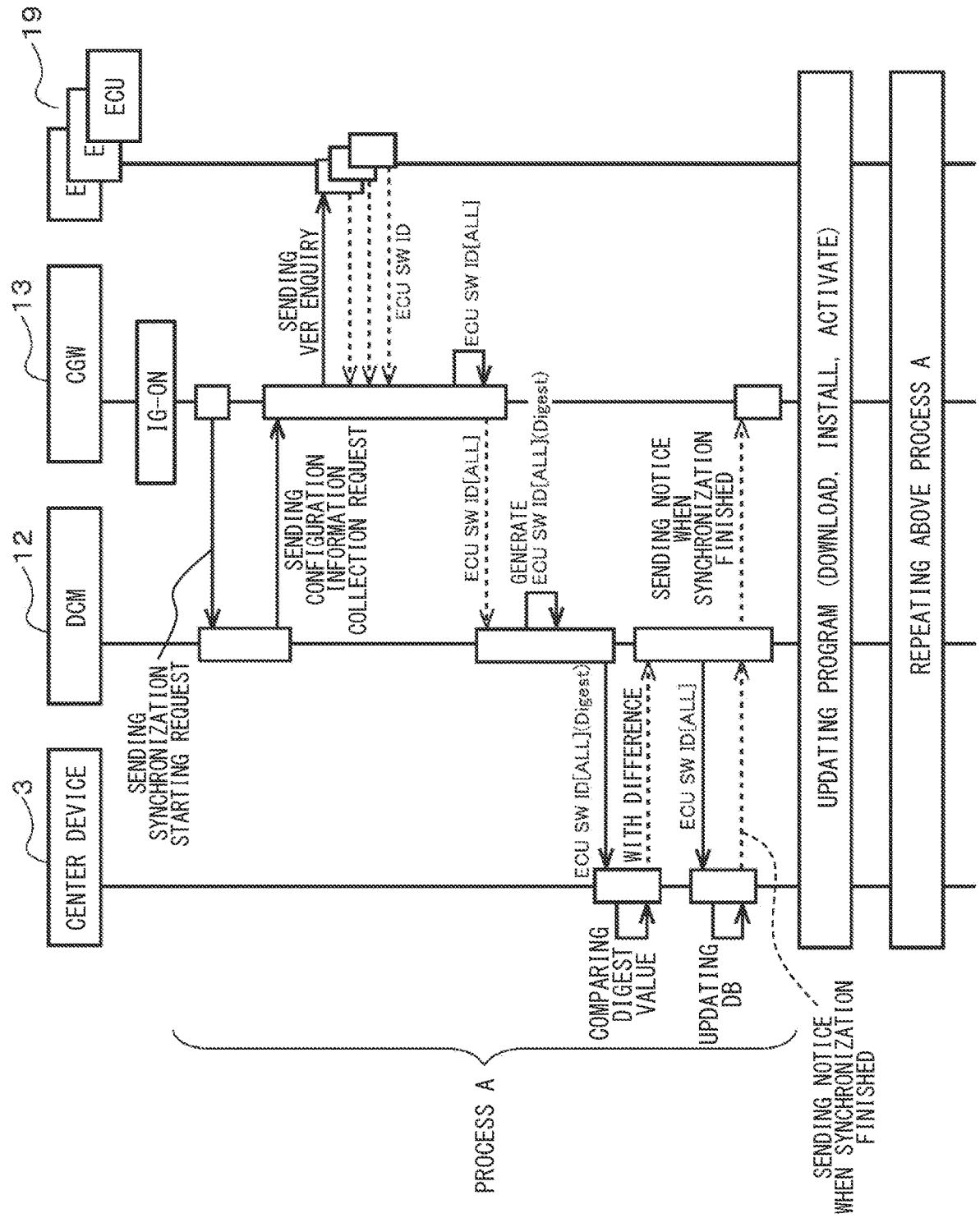
FIG. 8 is a sequence diagram illustrating processing procedures executed between the center device and a vehicle system.

FIG. 8 illustrates "vehicle configuration information synchronization", that the master device 11 of the vehicle system 4 is initially transmitted from the vehicle system 4 to the center device 3. When, on the vehicle side, the IG switch 37 is turned on, the CGW 13 transmits a "synchronization initial request" to the DCM 12 with the turning-on as a trigger. The DCM 12 receives the synchronization initial request, and returns a "configuration information collection request" to the CGW 13. The CGW 13 inquires each of the ECU 19 for a program version. Each of ECU 19 returns an "ECU SW ID" to the CGW 13. The ECU 19 of which a memory configuration is the double-bank or the suspend also returns bank information indicating which of a plurality of banks is an active bank and which is an inactive bank to the CGW 13. Each ECU 19 may also transmit calibration information of a control target actuator or the like, license information for receiving a program update service, and a trouble code occurring in the ECU 19 to the CGW 13.

When reception of the "ECU SW ID" from each ECU 19 is completed, the CGW 13 transmits all the pieces of information to the DCM 12 along with the "VIN". In this case, the "Vehicle SW ID" and the "Sys ID" managed by the CGW 13 may also be transmitted to the DCM 12. The DCM 12 receives the information, and generates a single hash value that is a digest value for all of the "ECU SW IDs" by using, for example, a hash function. In a case where, for example, SHA-256 is used as the hash function, data values obtained by serially connecting values of all of the "ECU SW IDs" to each other are divided into message blocks every 64 bytes, the data values of the first message block is applied to an initial hash value to obtain a hash value with 32-byte length, and the data values of the succeeding message block is sequentially applied to the hash value, and, finally, a hash value of 32-byte length is obtained. Here, the DCM 12 may generate a single hash value not only for all of the "ECU SW IDs" but also for values including the "Vehicle SW ID", the "Sys ID", the bank information, and the calibration information.

The DCM 12 transmits the digest value of the "ECU SW ID" obtained as described above to the center device 3 along with the "VIN", the "vehicle model", and the "access log". The DCM 12 may transmit the trouble code or the license information along with the digest value. Hereinafter, the digest value may be referred to as a "configuration information digest", and all data values of the "ECU SW IDs" that are basic thereof may be referred to as "configuration information all". The "configuration information all" may include the "Vehicle SW ID", the "Sys ID", the bank information, and the calibration information.

The center device 3 compares digest values or updates the individual vehicle information DB 213. The center device 3 synchronized with the configuration information checks availability of program update, and notifies the vehicle system 4 of the campaign information in a case where the program update is available. Thereafter, the vehicle system 4 downloads a distribution package, installs the distribution package in the target ECU 19, and activates a new program. The CGW 13 transmits a "synchronization initial request" to the DCM 12 with completion of the update process as a trigger, and then performs the same process as described above until a synchronization completed notification is performed. The above-mentioned processes may be triggered by turning on the IG switch 37, may be triggered by a shift lever of the vehicle set to "parking; parking", or may be executed after update of the program. The above-mentioned "turning on the IG switch 37" and "a shift lever of the vehicle set to "parking"" are examples of "change in vehicle condition".

Figure 9:
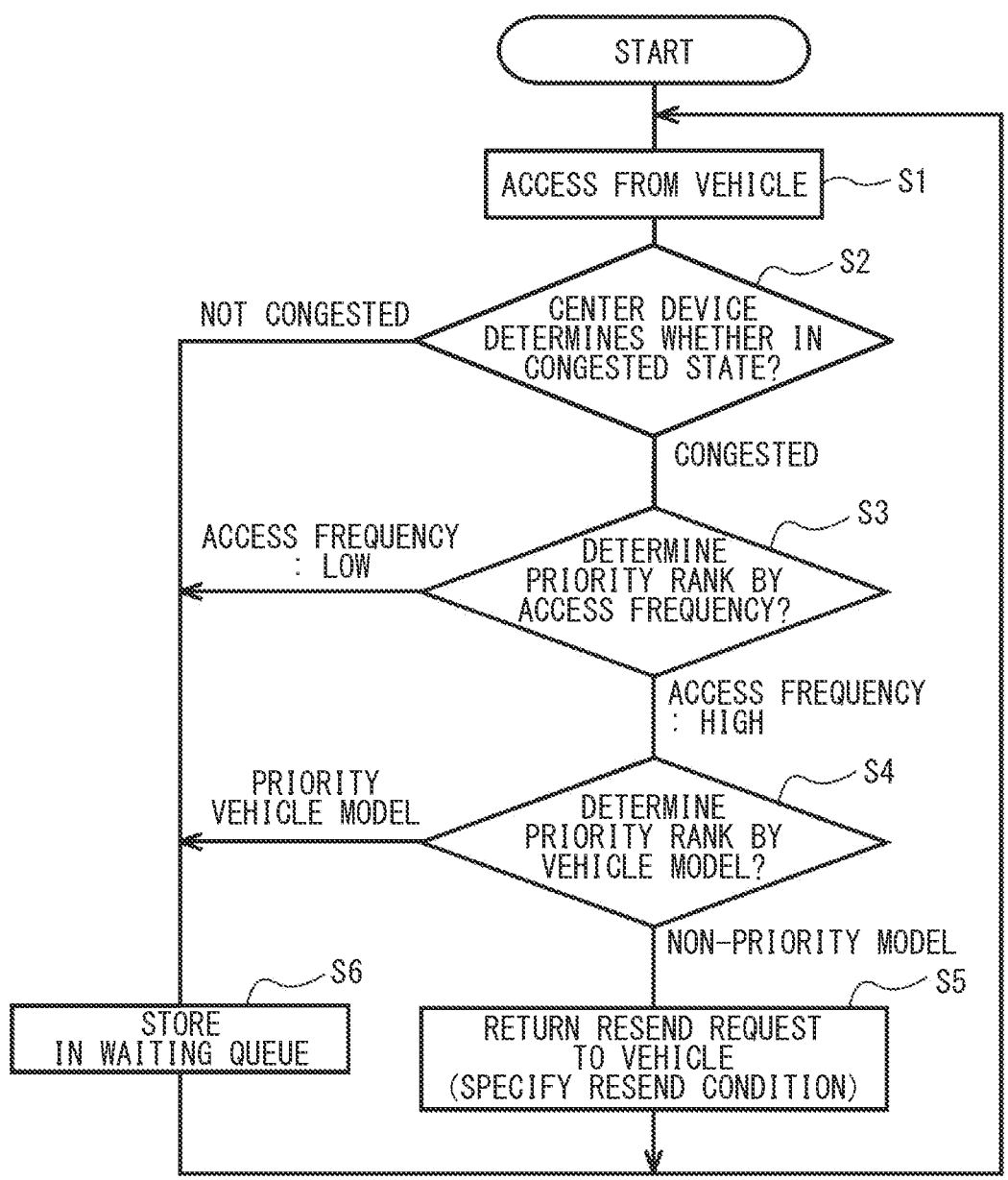
FIG. 9 is a flowchart showing a processing content executed by an individual vehicle registering unit.

The function of this embodiment is described below, as this embodiment is characterized by the process that each vehicle uploads the individual vehicle information to the center device 3 and the uploaded individual vehicle information is written to the individual vehicle information DB 213. As shown in FIG. 9, an access for uploading the individual vehicle information is generated from each vehicle system 4 to the center device 3 (S1). As shown in FIG. 8, the access corresponds to a process that the DCM 12 sends the digest value of the "ECU SW ID" together with the "VIN" and "access log" to the center device 3.

Next, the individual vehicle information registration unit 209 of the center device 3 determines whether or not the center device 3 is in a congested state (S2). Here, the individual vehicle information registration unit 209 acquires the write waiting number by referring to the waiting queue 213Q of the individual vehicle information DB 213. Then, when the write waiting number is, for example, 70% or more of the total write waiting number that can be stored in the wait queue 213Q, it is determined that the state is congested. The above-mentioned 70% of the total write waiting number is an example of a predetermined number. The process of step S2 is shown as a "save request" and a "request result" in FIG. 10.

In step S2, when the individual vehicle information registration unit 209 determines that it is not in the congested state, the uploaded individual vehicle information is stored in the waiting queue 213Q (S6). On the other hand, when it is determined that the center device is in the congested state, the individual vehicle information registration unit 209 determines the priority rank based on the access frequency by referring to the item of "access log" in the individual vehicle information (S3). Here, for example, when there are three or more accesses in a week, it is determined that the access frequency is "high", and the process proceeds to step S4. When there are only two or less accesses in a week, it is determined that the access frequency is "low". The process proceeds to step S6.

In step S4, the individual vehicle information registration unit 209 refers to the item of "vehicle model" in the individual vehicle information to determine the priority rank according to vehicle model; version and vehicle type. Regarding the specific "vehicle models" in the form of "aaa" and "bbb", for example, when "aaa" is recognized as having high priority in registering the individual vehicle information, models other than "aaa" are considered as non-priority in registering the individual vehicle information. For example, a luxury car or the like, which is relatively multifunctional, may be prioritized. When the "vehicle model" is "aaa", the process proceeds to step S6, and when it is in any other model, a resend request for the individual vehicle information is transmitted to the master device 11 of the vehicle (S5).

In the resend request, the individual vehicle information registration unit 209 may specify a condition that triggers the master device 11 to retransmit the individual vehicle information. For example, the condition for resending is that 20 minutes must elapse from the time when the resend request is received. Upon receiving the resend request from the center device 3, the DCM 12 transmits the individual vehicle information to the center device 3 according to the specified resend conditions when, for example, 20 minutes have elapsed from that point.

As described above, according to the present embodiment, the individual vehicle information DB 213 of the center device 3 includes a waiting queue 213Q for sequentially writing the plurality of individual vehicle information transferred by the individual vehicle information registration unit 209. The individual vehicle information registration unit 209 refers to the waiting queue 213Q when it tries to transfer the individual vehicle information transmitted from the master device 11 on the occasion of a predetermined vehicle status change to the individual vehicle information DB 213, and stores the individual vehicle information in the waiting queue 213Q when the write waiting number is lower than the predetermined number. On the other hand, when the write waiting number in the waiting queue 213Q is equal to or greater than the predetermined number, the individual vehicle information registration unit 209 inputs the individual vehicle information once any of the items included in the individual vehicle information satisfies the write priority condition. When any one of the items in the individual vehicle information satisfies the write priority condition, the individual vehicle information is stored in the waiting queue 213Q, but if all of the above items do not satisfy the write priority condition, the individual vehicle information is not stored in the waiting queue 213Q.

Accordingly, when the individual vehicle information registration unit 209 receives a large number of individual vehicle information intensively, once any one of the items included in the individual vehicle information satisfies the write priority conditions, the information is stored in the memory unit 213S of the individual vehicle information DB 213 by storing it in the waiting queue 213Q. Therefore, the large number of individual vehicle information can be efficiently processed according to their contents.

Specifically, one of the above items is access log information indicating the date and time when the master device 11 transmitted the information in chronological order, and the individual vehicle information registration unit 209 determines that the write priority conditions are satisfied if the access frequency based on the access log information is less than the predetermined frequency. As a result, the individual vehicle information registration unit 209 can preferentially transfer and store the individual vehicle information of the vehicle with a relatively low access frequency and few opportunities to transmit the individual vehicle information to the individual vehicle information DB 213.

One of the aforementioned items is the "vehicle model", which is information indicating the type of vehicle, and the individual vehicle information registration unit 209 determines the write priority condition is met once the "vehicle model" meets a specific condition. Thereby, for example, the individual vehicle information for a luxury vehicle can be registered in the individual vehicle information DB 213 by giving priority to the luxury vehicle having relatively multifunctional functions.

When none of the above items satisfy the write priority condition, the individual vehicle information registration unit 209 transmits a resend request for the individual vehicle information to the corresponding master device 11, so that when communication between the master device 11 and the center device 3 temporarily becomes congested, the congestion can be resolved by having the master device 11 resend the individual vehicle information after a certain time elapsed.

In the resend request, the individual vehicle information registration unit 209 specifies the conditions that trigger the master device 11 to perform the resending, and the master device 11 resends the individual vehicle information when the specified resending conditions are met. As a result, the individual vehicle information registration unit 209 can flexibly eliminate the congestion state by dynamically setting the resending condition according to the degree of congestion of communication.

OTHER EMBODIMENTS

Only one of steps S3 and S4 may be executed.

Regarding the resending condition specified in the resend request, the date and time are specified, or it specifies that the vehicle is in a specific position or area.

In step S5, even if the individual vehicle information registration unit 209 does not specify the conditions for resending the items included in the vehicle information in the resend request, the DCM 12 may still retransmit the items included in the vehicle information under conditions predetermined by the DCM 12, for example, resending to the center device 3 immediately upon receiving the resend request or, resending after a certain period of time has passed.

The specific content of each condition is an example, and may be changed as appropriate according to the individual design. For example, regarding the type of vehicle, the individual vehicle information may be stored with priority given to any vehicle equipped with an automatic driving function.

The functions executed by the center device 3 may be realized by hardware or software. The functions may be realized by hardware and software in cooperation.

The rewrite data may be not only an application program, but also data such as a map or data such as control parameters.

Although the present disclosure has been described in accordance with embodiments, it is understandable that the present disclosure is not limited to such embodiments or structures. The present disclosure incorporates various modifications and variations within the scope of equivalents. In addition, various combinations and configurations, as well as other combinations and configurations that include only one element, more, or less, are within the scope and spirit of the present disclosure.

The invention claimed is:

1. A center device, comprising:
at least one of (i) a circuit and (ii) a processor having a memory storing computer program code, wherein
the at least one of (i) the circuit and (ii) the processor is configured to cause the center device to:
wirelessly communicate with a vehicle device mounted in a vehicle, the vehicle device including a plurality of electronic control units (ECUs);
store vehicle information in a database, the vehicle information being transmitted from the vehicle device upon a predetermined change in vehicle status; and
transmit the vehicle information to the database and write the vehicle information in the database upon receiving the vehicle information,
wherein the database includes a waiting queue for sequentially writing a plurality of transmitted vehicle information, and
the at least one of (i) the circuit and (ii) the processor is further configured to cause the center device to, by referring to the waiting queue when transmitting the vehicle information to the database:
store the vehicle information in the waiting queue when a write waiting number in the waiting queue is less than a predetermined number;
store the vehicle information in the waiting queue when the write waiting number in the waiting queue is equal to or greater than the predetermined number and when any one of items included in the vehicle information satisfies a write priority condition; and
not store the vehicle information in the waiting queue when the write waiting number in the waiting queue is equal to or greater than the predetermined number and when all of the items included in the vehicle information do not satisfy the write priority condition.

2. The center device according to claim 1,
wherein one of the items included in the newly received vehicle information is access log information indicating, in chronological order, date and time when the vehicle device transmits one of the items included in the vehicle information, and
the control unit is configured to determine that the write priority condition is satisfied when an access frequency based on the access log information is less than a predetermined frequency.

3. The center device according to claim 1,
wherein one of the items included in the vehicle information indicates a vehicle type, and
the control unit is configured to determine that the write priority condition is satisfied when the vehicle type satisfies a specific condition.

4. The center device according to claim 1, wherein
the control unit is configured to transmit a resend request for the vehicle information to the vehicle device when all of the items in the vehicle information do not satisfy the write priority condition.

5. A vehicle information communication system, comprising:
a vehicle device including a plurality of electronic control units (ECUs) mounted in a vehicle; and
a center device including a communication unit for wireless communication with the vehicle device;
wherein the center device further includes:
a vehicle information storage unit storing vehicle information transmitted from the vehicle device upon a predetermined change in vehicle status; and
a control unit transmitting the vehicle information to the vehicle information storage unit and controlling the vehicle information storage unit to store the vehicle information therein when the communication unit receives the vehicle information,
wherein the vehicle information storage unit includes a waiting queue for sequentially writing a plurality of vehicle information transmitted by the control unit, and
the control unit is configured to, by referring to the waiting queue when transmitting the vehicle information to the vehicle information storage unit:
store the vehicle information in the waiting queue when a write waiting number in the waiting queue is less than a predetermined number;

store the vehicle information in the waiting queue when the write waiting number in the waiting queue is equal to or greater than the predetermined number and when any one of items included in the vehicle information satisfies a write priority condition; and not store the vehicle information in the waiting queue when the write waiting number in the waiting queue is equal to or greater than the predetermined number and when all of the items included in the vehicle information do not satisfy the write priority condition.

6. The vehicle information communication system according to claim 5, wherein one of the items included in the newly received vehicle information is access log information indicating, in chronological order, date and time when the vehicle device transmits one of the items included in the vehicle information, and the control unit is configured to determine that the write priority condition is satisfied when an access frequency based on the access log information is less than a predetermined frequency.

7. The vehicle information communication system according to claim 5, wherein one of the items included in the vehicle information indicates a vehicle type, and the control unit is configured to determine that the write priority condition is satisfied when the vehicle type satisfies a specific condition.

8. The vehicle information communication system according to claim 5, wherein the vehicle device is configured to transmit one of the items included in the vehicle information when ignition switch of the vehicle is on, or when a vehicle gear is put in park.

9. The vehicle information communication system according to claim 5, wherein the control unit is configured to transmit a resend request for the vehicle information to the vehicle device, when all of the items included in the vehicle information do not satisfy the write priority condition.

10. The vehicle information communication system according to claim 9, wherein in the resend request, the control unit is configured to specify a condition that triggers the vehicle device to retransmit one of the items included in the vehicle information, the vehicle device retransmits one of the items included in the vehicle information when the condition is met.

11. A program product for a center device, wherein the center device includes:

a communication unit for wireless communication with a vehicle device mounted in a vehicle, the vehicle device including a plurality of electronic control units (ECUs);

a vehicle information storage unit storing vehicle information that is transmitted from the vehicle device upon a predetermined change in vehicle status; and a control unit transmitting the vehicle information to the vehicle information storage unit and writing the vehicle information in the vehicle information storage unit when the communication unit receives the vehicle information;

wherein:

the vehicle information storage unit includes a waiting queue for sequentially writing a plurality of vehicle information transmitted by the control unit; and the program product is stored on at least one computer readable medium and comprises instructions configured to, when executed, cause the control unit to, by referring to the waiting queue when transmitting the vehicle information to the vehicle information storage unit:

store the vehicle information in the waiting queue when a write waiting number in the waiting queue is less than a predetermined number;

store the vehicle information in the waiting queue when the write waiting number in the waiting queue is equal to or greater than the predetermined number and when any one of items included in the vehicle information satisfies a write priority condition; and not store the vehicle information in the waiting queue when the write waiting number in the waiting queue is equal to or greater than the predetermined number and when all of the items included in the vehicle information do not satisfy the write priority condition.

12. A method for a center device, wherein the center device includes:

a communication unit for wireless communication with a vehicle device mounted in a vehicle, the vehicle device including a plurality of electronic control units (ECUs);

a vehicle information storage unit storing vehicle information that is transmitted from the vehicle device upon a predetermined change in vehicle status; and a control unit transmitting the vehicle information to the vehicle information storage unit and writing the vehicle information in the vehicle information storage unit when the communication unit receives the vehicle information;

wherein:

the vehicle information storage unit includes a waiting queue for sequentially writing a plurality of vehicle information transmitted by the control unit; and the method further comprises, by referring to the waiting queue when transmitting the vehicle information to the vehicle information storage unit:

storing, with the control unit, the vehicle information in the waiting queue when a write waiting number in the waiting queue is less than a predetermined number;

storing, with the control unit, the vehicle information in the waiting queue when the write waiting number in the waiting queue is equal to or greater than the predetermined number and when any one of items included in the vehicle information satisfies a write priority condition; and not storing, with the control unit, the vehicle information in the waiting queue when the write waiting number in the waiting queue is equal to or greater than the predetermined number and when all of the items included in the vehicle information do not satisfy the write priority condition.

13. A program product for a vehicle information communication system, wherein the system includes:

a vehicle device including a plurality of electronic control units (ECUs) mounted in a vehicle; and a center device including a communication unit for wireless communication with the vehicle device;

wherein:

the center device further includes:

a vehicle information storage unit storing vehicle information transmitted from the vehicle device upon a predetermined change in vehicle status; and a control unit transmitting the vehicle information to the vehicle information storage unit and controlling the vehicle information storage unit to store the vehicle information therein when the communication unit receives the vehicle information;

the vehicle information storage unit includes a waiting queue for sequentially writing a plurality of vehicle information transmitted by the control unit; and the program product is stored on at least computer readable medium and comprises instructions configured to, when executed, cause the control unit to, by referring to the waiting queue when transmitting the vehicle information to the vehicle information storage unit:

store the vehicle information in the waiting queue when a write waiting number in the waiting queue is less than a predetermined number;

store the vehicle information in the waiting queue when the write waiting number in the waiting queue is equal to or greater than the predetermined number and when any one of items included in the vehicle information satisfies a write priority condition; and not store the vehicle information in the waiting queue when the write waiting number in the waiting queue is equal to or greater than the predetermined number and when all of the items included in the vehicle information do not satisfy the write priority condition.

14. A method for a vehicle information communication system, wherein the system includes a vehicle device including a plurality of electronic control units (ECUs) mounted in a vehicle; and a center device including a communication unit for wireless communication with the vehicle device;

wherein:

the center device further includes:

a vehicle information storage unit storing vehicle information transmitted from the vehicle device upon a predetermined change in vehicle status; and a control unit transmitting the vehicle information to the vehicle information storage unit and controlling the vehicle information storage unit to store the vehicle information therein when the communication unit receives the vehicle information;

the vehicle information storage unit includes a waiting queue for sequentially writing a plurality of vehicle information transmitted by the control unit; and the method further comprises, by referring to the waiting queue when transmitting the vehicle information to the vehicle information storage unit:

storing, with the control unit, the vehicle information in the waiting queue when a write waiting number in the waiting queue is less than a predetermined number;

storing, with the control unit, the vehicle information in the waiting queue when the write waiting number in the waiting queue is equal to or greater than the predetermined number and when any one of items included in the vehicle information satisfies a write priority condition; and not storing, with the control unit, the vehicle information in the waiting queue when the write waiting number in the waiting queue is equal to or greater than the predetermined number and when all of the items included in the vehicle information do not satisfy the write priority condition.

\* \* \* \* \*

UNITED STATES PATENT AND TRADEMARK OFFICE
CERTIFICATE OF CORRECTION

PATENT NO. : 12,175,817 B2
APPLICATION NO. : 17/866891
DATED : December 24, 2024
INVENTOR(S) : Nao Sakurai et al.

Page 1 of 1

It is certified that error appears in the above-identified patent and that said Letters Patent is hereby corrected as shown below:

On the Title Page

Please add the following:
(30) Foreign Application Priority Data
Jan. 21, 2020 (JP)................................2020-007527

Signed and Sealed this
Third Day of June, 2025

Coke Morgan Stewart
*Acting Director of the United States Patent and Trademark Office*